(12) United States Patent
Ault et al.

(10) Patent No.: US 6,438,151 B1
(45) Date of Patent: Aug. 20, 2002

(54) DEVICE FOR WAVEFRONT CORRECTION IN AN ULTRA HIGH POWER LASER

(75) Inventors: Earl R. Ault, Livermore; Brian J. Comaskey, Walnut Creek; Thomas C. Kuklo, Oakdale, all of CA (US)

(73) Assignee: The Regents of the University of California, Oakland, CA (US)

(*) Notice: Subject to any disclaimer, the term of this patent is extended or adjusted under 35 U.S.C. 154(b) by 43 days.

(21) Appl. No.: 09/691,505

(22) Filed: Oct. 18, 2000

(51) Int. Cl.[7] ................................................. H01S 3/20
(52) U.S. Cl. .......................... 372/51; 372/34; 372/75; 372/78
(58) Field of Search ........................... 372/51, 34, 75, 372/66, 69, 78

(56) References Cited

U.S. PATENT DOCUMENTS

| | | | | |
|---|---|---|---|---|
| 3,678,410 A | * | 7/1972 | Kocher et al. | 372/51 |
| 3,717,825 A | * | 2/1973 | Gerlach | 372/51 |
| 3,931,594 A | * | 1/1976 | Schuefer | 372/51 |
| 6,339,608 B1 | * | 1/2002 | Ault | 372/51 |

* cited by examiner

Primary Examiner—Leon Scott, Jr.
(74) Attorney, Agent, or Firm—Eddie E. Scott; Alan H. Thompson

(57) ABSTRACT

A system for wavefront correction in an ultra high power laser. As the laser medium flows past the optical excitation source and the fluid warms its index of refraction changes creating an optical wedge. A system is provided for correcting the thermally induced optical phase errors.

11 Claims, 8 Drawing Sheets

DEVICE FOR WAVEFRONT CORRECTION IN AN ULTRA HIGH POWER LASER

CROSS-REFERENCE TO RELATED APPLICATIONS

This application is directed to subject matter disclosed in co-pending U.S. patent application Ser. No. 09/691,506, entitled "METHOD FOR BEAM STEERING COMPENSATION IN AN ULTRA-HIGH POWER LIQUID LASER," filed on Oct. 10, 2000, by inventor Earl R. Ault. The related application is commonly assigned to The Regents of the University of California. U.S. Patent application Ser. No. 09/691,506 was issued as U.S. Pat. No. 6,339,608 on Jan. 15, 2002. The terminal portion of any patent granted on the subject application beyond the expiration date of U.S. Pat. No. 6,339,608 is disclaimed in accordance with a Terminal Disclaimer filed in this application.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to a lasers, and more particularly to a system for wavefront correction in an ultra high power laser.

2. State of Technology

Ultra high power lasers suffer from thermally induced distortion of the optical wavefront caused by heating of the laser media by waste heat from the excitation process and absorption of laser radiation.

There are many applications ultra high power lasers. These applications include power beaming, laser guide stars, illuminators, material processing, and weapons. This type of laser utilizes a flowing lasing liquid that is optically excited to provide a powerful laser beam. Since the host is a liquid, it can be removed from the optical cavity when it becomes heated avoiding the inevitable optical distortion and birefringence common to glass and crystal hosts. This heat is deposited in the liquid and causes a small, but significant, change in the local index of refraction. As the fluid flows past the windows that allow the pump radiation to enter the gain volume, it integrates waste heat and exits the flow region at a slightly higher temperature than the inlet. This difference is less than a degree centigrade, but changes the optical path by many wavelengths of light. For uniform deposition of pump light, the change in index is linear causing a simple optical wedge to accumulate in the optical path.

A liquid laser is described in U.S. Pat. No. 3,717,825 to Carl Zeiss-Stiftung, Wuerttemburg, Federal Republic of Germany, patented Feb. 20, 1973. This patent includes the following description:". . . a dyestuff laser provided with a liquid guiding chamber through which circulates a cooled laser liquid.

The laser is provided with a U-shaped laser active zone formed by a light transmitting longitudinal cap into which extends a tongue forming in said cap a U-shaped zone of uniform cross section. This U-shaped laser active zone is disposed in a focal line of an elliptically shaped pump light reflector while a source of pump light is disposed in the other focal line."

U.S. Pat. No. 3,931,594 to Fritz Peter Schafer, assigned to Max-Planck-Gesellschaft zur Forderung der Wissenschaften e.V., patented Jan. 6, 1976, describes a transverse-flow cell for a laser. This patent includes the following description:"The cell of a liquid laser is defined between the rounded, parallel edges four coaxial cylinder sectors of fused quartz. The narrow gaps circumferentially bounded by the flat, converging side faces of the sectors provide conduits for rapid flow of dye liquid into and out of the cell which extend over the full axial length of the cell. The light of a flash tube is directed toward the cell through the cylindrically arcuate outer face of each sector."

U.S. Pat. No. 3,678,410 to Robert C. Kocher, Franklin K. Moore, Harold Samelson, and William R. Watson, assigned to GTE Laboratories Incorporated, patented Jul. 18, 1972 describes a transverse flowing liquid laser. This patent includes the following description:"A laser cell for a transverse flow liquid laser has an active region in the form of a rectangular prism and cylindrical input and output chambers mounted in spaced-apart relationship in the transverse direction at opposite ends of the active region. A baffle positioned in the input chamber causes the liquid to flow uniformly through the active region."

U.S. Pat. No. 5,189,681 to Paul Blaszuk, assigned to United Technologies Corporation, patented Feb. 23, 1993 describes a high powered laser with reduced optical aberration. This patent includes the following description:"a laser includes an optical cavity with opposed electrical excitation electrodes adjacent to the optical cavity extending along a portion of an optic axis. A gaseous gain medium is located in the optical cavity and has a first region at a first temperature and a second region adjacent to one of the electrodes at a second temperature. Also included is an unstable optical resonator assembly positioned within the optical cavity that has a first mirror positioned at a first end of the optical cavity that has a focus therein located along the optic axis. A second mirror is positioned opposed to the first mirror at a second end of the optical cavity. The second mirror has a focus within the optical cavity substantially at the first mirror focus. The first and second mirrors are configured to invert an optical beam transiting therebetween, thereby having the optical beam substantially avoid the second gaseous gain medium region."

U.S. Pat. No. 4,707,836 to Alan J. B. Travis, assigned to United Kingdom Atomic Energy Authority, patented Nov. 17, 1987 describes a laser control system. This patent includes the following description:"For monitoring and controlling a laser beam, sample beams are monitored for three characteristics and the three monitor outputs are used to control the beam generation. The three characteristics monitored are the transverse distribution of energy within the beam (a) under far field conditions and (b) under near field conditions, and (c) total power within a known proportion of the beam. These are employed respectively to control (a) the position of a mirror which forms part of an optical cavity within the laser structure, (b) a beam pointing element, (c) a beam expander and (d) a power supply for the laser."

SUMMARY OF THE INVENTION

Ultra high power lasers suffer from thermally induced distortion of the optical wavefront caused by heating of the laser media by waste heat from the excitation process and absorption of laser radiation. As the laser medium flows past the optical excitation source and the fluid warms, its index of refraction changes (positive or negative change) creating an optical wedge.

Thermally induced distortion of the optical wavefront caused by heating of the laser media by waste heat from the excitation process and absorption of laser radiation are corrected using the system of the present invention. The present invention provides a laser system having an optical cavity, a lasing liquid within said optical cavity, a laser pumping device within said optical cavity, and a circulation system for circulating said lasing liquid into and out of said optical cavity. The laser pumping device within said optical cavity produces thermally induced optical phase errors. A system is provided for correcting the thermally induced optical phase errors.

Additional aspects, advantages, and features of the invention are set forth in part in the following description. Various aspects, advantages, and features of the invention will become apparent to those skilled in the art upon examination of the description and by practice of the invention.

DETAILED DESCRIPTION OF THE INVENTION

Ultra high power lasers suffer from thermally induced distortion of the optical wavefront caused by heating of the laser media by waste heat from the excitation process and absorption of laser radiation. As fluid flows past the windows that allow the pump radiation to enter the gain volume, it integrates waste heat and exits the flow region at a slightly higher temperature than the inlet. This difference is less than a degree centigrade, but changes the optical path by many wavelengths of light. For uniform deposition of pump light, the change in index is linear causing a simple optical wedge to accumulate in the optical path.

The invention described and claimed in this application deals with this problem. An embodiment of the present invention is described that illustrates the invention used to correct the thermally induced optical phase errors in ultra-high power liquid lasers. The gain medium is divided into two equal parts, placed in series within the optical cavity, and arranged to flow in opposite directions. The resulting optical wedges are equal and opposite causing them to cancel to first order.

Because of the Beer's law (exponential) nature of the pump radiation absorption, there is a second order term that does not cancel. This distortion is smaller than the original wedge and is a simple parabola in the direction transverse to the flow.

Residual distortion that is not canceled, due to the Beer's law nature of the exponential absorption of the pump radiation, is removed with a special mirror that is curved into the shape of a parabola. Calculations indicate that for 100 kW cw Nd liquid laser, these cancellations can reduce the wavefront distortion to less than 0.1 wave peak to valley.

Residual phase errors are corrected with a deformable mirror. Reverser optics are introduced to fold the image of the active zone within the laser resonator much the same as a zig-zag path in a slab laser. Unlike a conventional zig-zag geometry, the internal surface reflection needed to get the beam folded appropriately is not available because those surfaces are open to allow the fluid to flow. Internal reflection in the orthogonal direction has been used in liquid lasers to cancel the exponential or Beer's Law component but not the thermal wedge. The remaining phase distortion that does not cancel is nearly a perfect parabola and in accordance with the invention described and claimed in this patent application, is cancelled with a deformable mirror (DM) of the opposite parabolic curvature. All this requires a high degree of cancellation of the linear portion of the thermal distortion. The essence of this embodiment is to actively control the wedge in one cell so as to achieve nearly perfect cancellation. The Beer's law component is then taken out with the deformable mirror.

Figure 1:
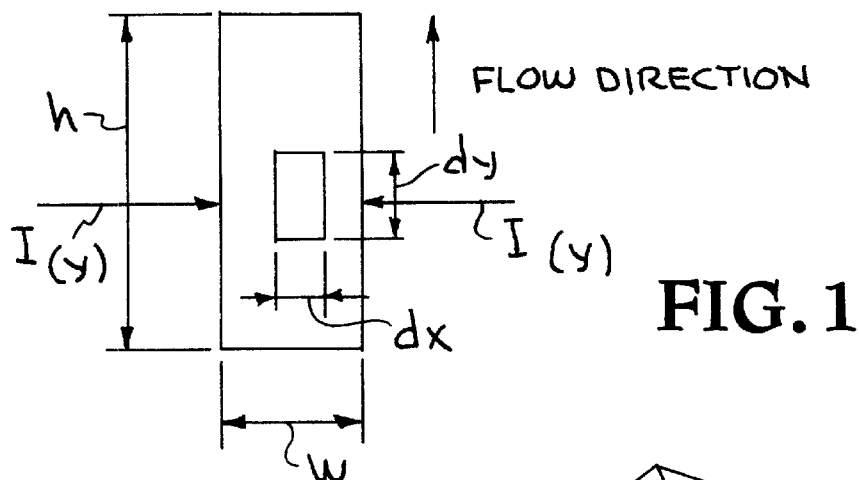
FIG. 1 shows side pumped liquid laser geometry.

Referring now to the drawings, and in particular to FIG. 1, side pumped liquid laser geometry is shown. Variables h and w refer to the channel height and width, respectively. The geometry used to determine the temperature of an element of fluid located at x,y is shown in FIG. 1. Here y is the flow direction and x is transverse to the flow. Pump light is incident on both sides of the flow channel and decays in the x direction according to Beer's law. The power deposited into the element of area dydx by pump light incident at x=0 is given by $$\frac{dI(x, y)}{dx} = \frac{d}{dx} I_0 e^{-\alpha x}.$$

For x=w, the channel width, we have $$\frac{dI(x, y)}{dx} = \frac{d}{dx} I_0 e^{-\alpha(w-x)}.$$

Combining the two power contributions gives $$\frac{dI(x, y)}{dx} = \alpha I_0 (e^{-\alpha x} + e^{-\alpha(w-x)}).$$

As the fluid flows in the y direction, it accumulates deposited energy and the temperature T(x,y) rises $$dE = \frac{dI(x, y)}{dx} dt = \rho c_p dT(x, y).$$

Since the flow velocity, $v_0$ is constant, and we can assume the shape factor for the pump intensity is separable into independent x and y components, we can write the elemental temperature rise as $$dT(x, y) = I(y)\frac{dI(x)}{dx}\frac{dy}{v_0\rho c_p}.$$

Two cases are treated. The first is uniform pump intensity, I(y)=1 and the second is a pump intensity distributed in the y direction with a Sine function, I(y)=Sin(πy/h), where h is the height of the flow channel. Other functions can be chosen, but this one simulates a condensing optical system that could be used to transport the diode light and is easy to integrate. Doing the integration gives the temperature rise at each x,y point within the fluid $$T(x, y) - T_0 = \frac{\alpha I_0(e^{-\alpha x} + e^{-\alpha(w-x)})}{v_0\rho c_p}\int_0^y I(y)dy,$$

$$T(x, y) - T_0 = \frac{\alpha I_0(e^{-\alpha x} + e^{-\alpha(w-x)})}{v_0\rho c_p}y \text{ uniform distribution,}$$

$$T(x, y) - T_0 = \frac{\alpha I_0(e^{-\alpha x} + e^{-\alpha(w-x)})}{v_0\rho c_p}(1 - \cos(\pi y/h))\text{ Sin}$$

distribution.

Figure 2A:
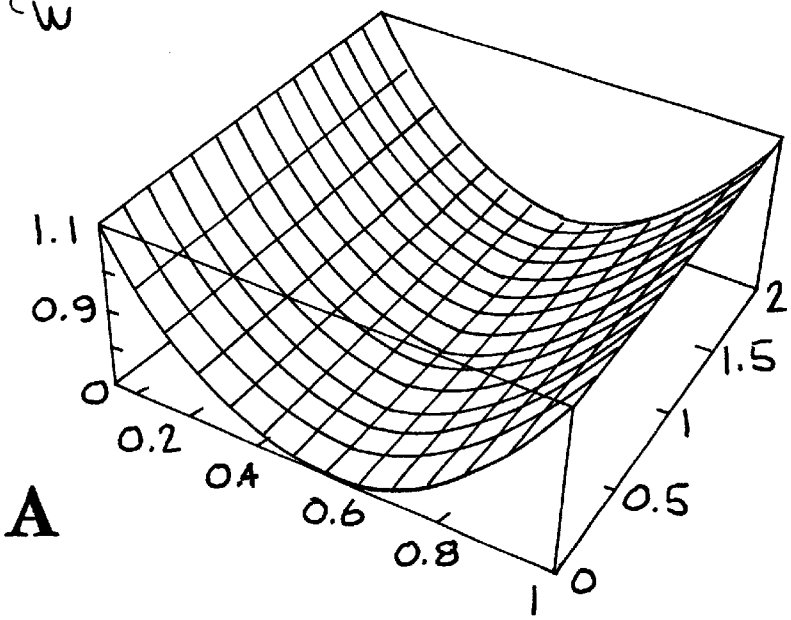
FIGS. 2A and 2B show realizations of the Uniform (Beer's Law) pump light profile and the Sine plus Beer's law profiles.
Figure 2B:
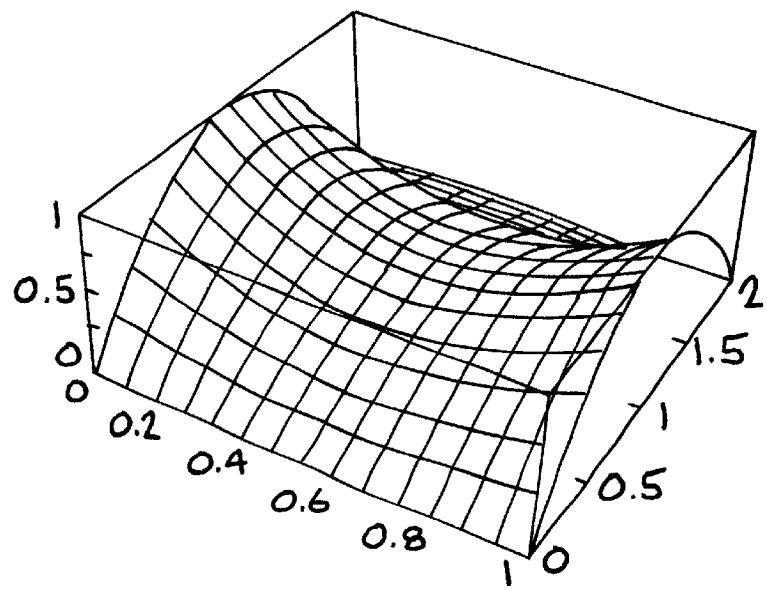

Referring now to FIGS. 2A and 2B, the shape of I(x,y) for the uniform and sine cases is shown. FIGS. 2A and 2B show realizations of the Uniform (Beer's Law) pump light profile and the Sine plus Beer's law profiles. Y ranges from 0 to 2 and x ranges from 0 to 1. Intensity is vertical.

Figure 3A:
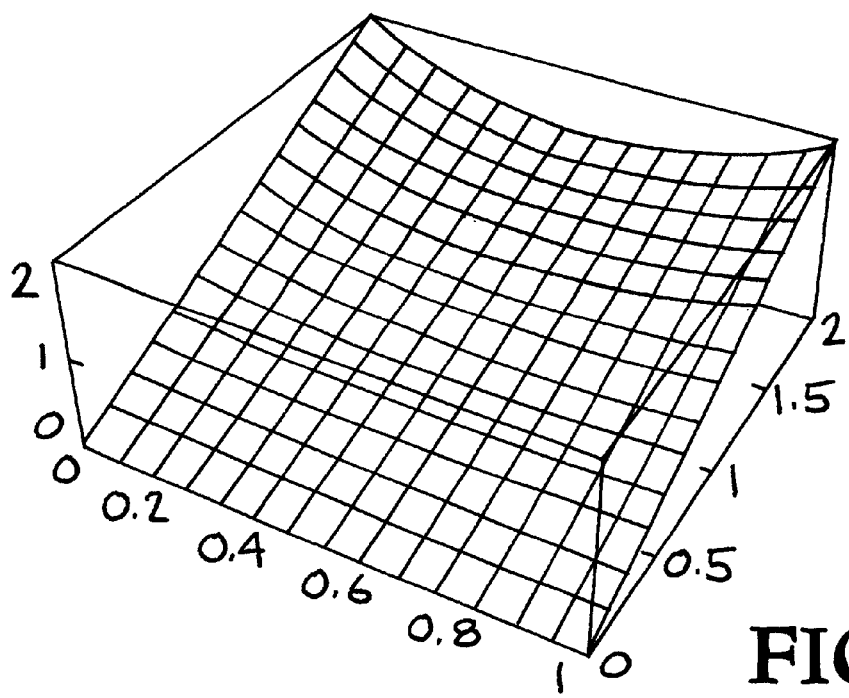
FIGS. 3A and 3B show normalized temperature rise as a function of x.
Figure 3B:
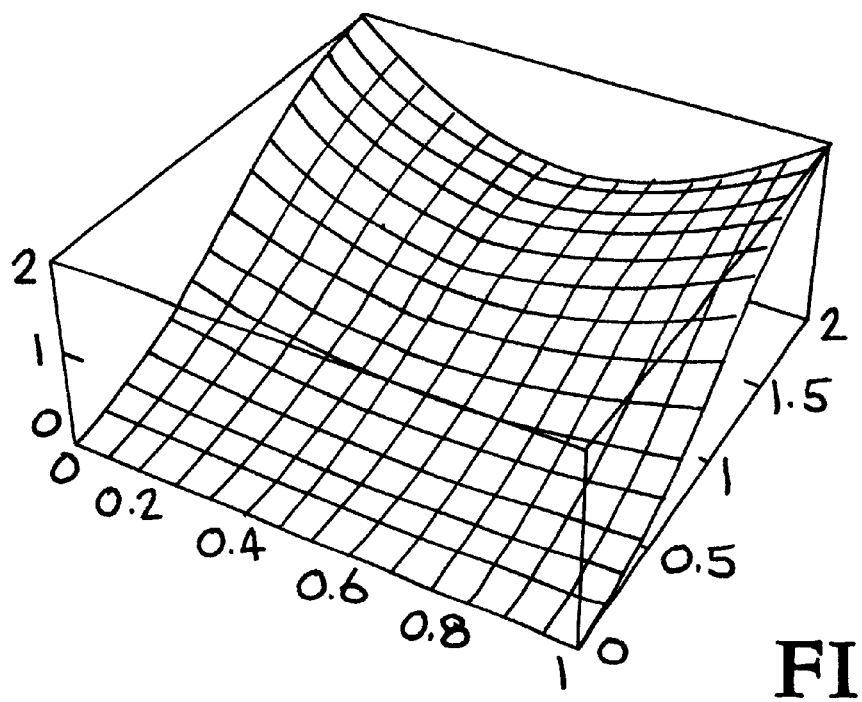

Referring now to FIGS. 3A and 3B, the same shapes when integrated to produce maps of T(x,y), normalized to display only the shape of the temperature distribution is shown. Later we will show cases using actual design parameters appropriate to 20 kW cw power oscillators. FIGS. 3A and 3B show Normalized temperature rise as a function of x and y. These shapes are obtained by integrating the pump distributions in the flow direction, y. Top is uniform case, bottom is sine case.

As can be seen from the figures above, there is an optical wedge that builds up as the fluid flows past the pump windows. In the present invention, we cancel this wedge by dividing the gain medium in half with the flow direction reversed in each section. Using a CW power oscillator model written in Excel we can explore this and other features of the liquid laser design. For the case of uniform pumping, we expect the wedge to cancel identically except for the exponential absorption in the x direction.

Figure 4:
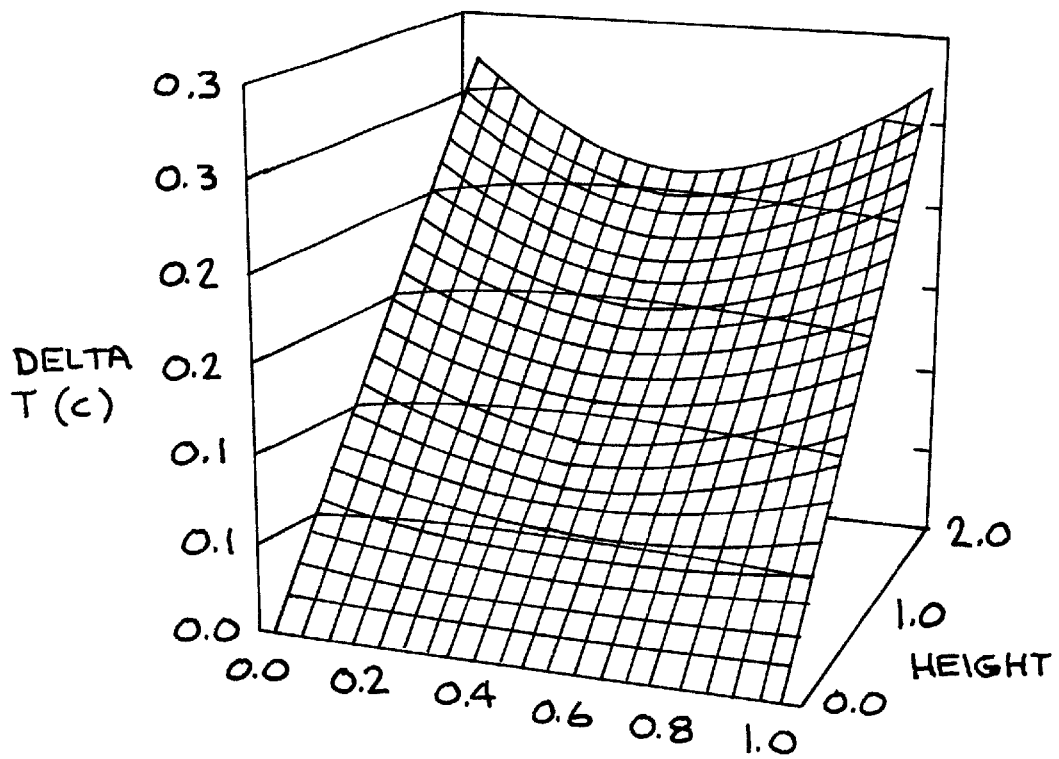
FIG. 4 shows temperature distribution in x and y for a 20 kW power oscillator pumped with a uniform distribution of pump light.

The model results for a 20 kW power oscillator are shown in FIG. 4. Here the temperature rise is shown for one half section of the gain medium. Note that in this case the corners reach only 0.3 degree C above the inlet temperature, but with the large dn/dT of typical liquids this causes a sizable optical path difference of about 20 waves center to edge. FIG. 4 shows temperature distribution in x and y for a 20 kW power oscillator pumped with a uniform distribution of pump light.

Figure 5:
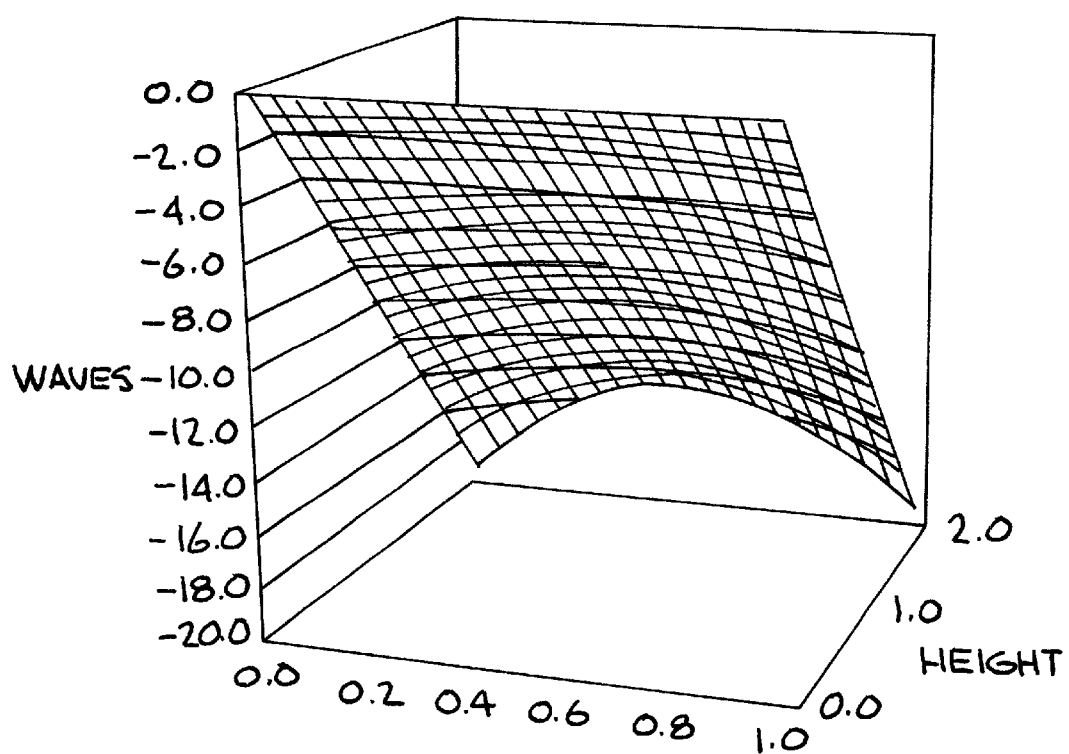
FIG. 5 shows optical path difference, center to edge, for half the gain medium. For SOCl2 dn/dT is negative.

Translating the temperature rise into optical path difference, OPD, for one half of the gain length gives FIG. 5. Since OPD is linear in T(x,y) this is just a rescaling of FIG. 4. FIG. 5 shows optical path difference, center to edge, for half the gain medium. For SOC12 dn/dT is negative. Combining both halves with one reversed with respect to the other cancels the linear wedge, but as expected there is a residual parabolic phase error of 4 waves caused by the Beer's law nature of the absorption. In the present invention, we propose to correct the residual using a parabolic shaped active mirror similar to the "E Mirror" developed for AVLIS.

This modal mirror can provide low order correction in one dimension once we specify the size and shape of the phase error. One of the most highly developed fluid lasers is the AVLIS dye laser AVLIS (Atomic Vapor Laser Isotope Separation). Development of this family of lasers took place at Lawrence Livermore National Laboratory over the period of 1972 to 1999.

Figure 6:
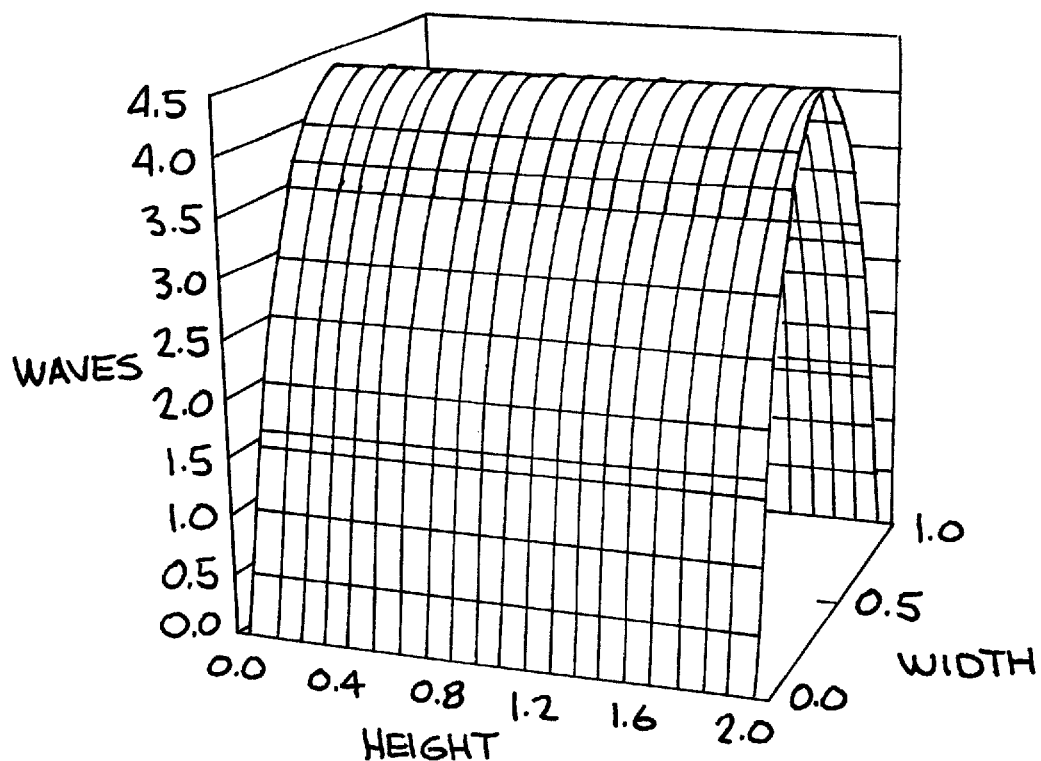
FIG. 6 shows wedge compensation OPD showing residual parabolic component.
Figure 7:
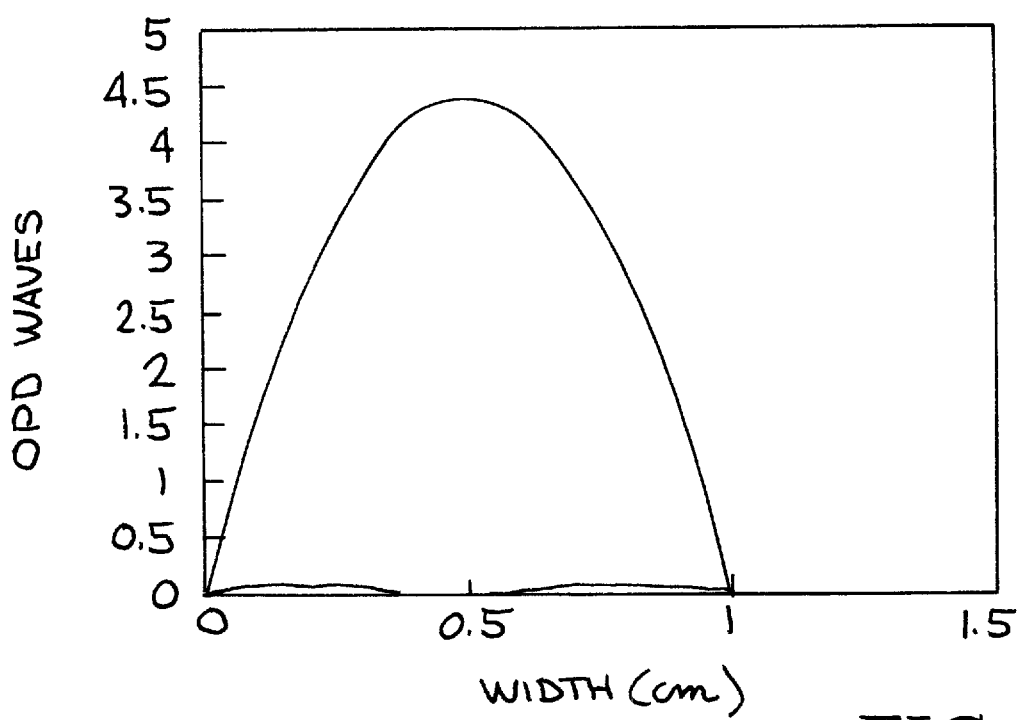
FIG. 7 shows phase error compensation using a low order modal mirror shaped as a parabola.

A Hartman sensor would the natural choice for measuring the wavefront and providing the needed slow (in time) feedback to adjust for changes in operating laser point. What is shown is the maximum error at full power. The error goes to zero as the power goes to zero. A simple parabolic correction cancels all phase error to within less than 0.1 waves, center to edge. As shown in FIG. 6 there is no error in the y direction so a single axis deformable mirror will suffice. FIG. 6 shows wedge compensation OPD showing residual parabolic component. FIG. 7 shows residual phase error compensation using a low order modal mirror shaped as a parabola. The curves show the centerline phase error without correction, the shape of the mirror needed to accomplish the correction, and the remaining residual error.

The uniform pump distribution is obviously a not wholly realizable situation, so excellent wavefront performance may be moot. The question is how does a non-uniform distribution perform? To test this case we chose a Sine distribution in the y direction and uniform in the z, or lasing direction. As shown in FIG. 3B the pump intensity surface is complex and it is not obvious that the wedges will cancel and the residual is a simple shape.

Figure 8:
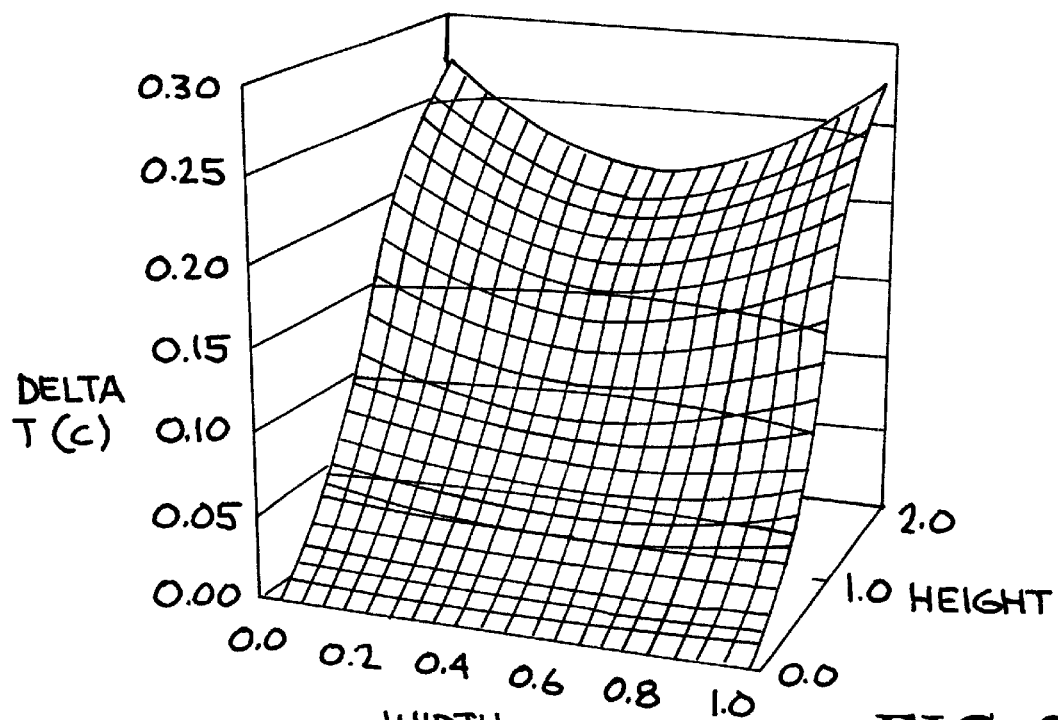
FIG. 8 shows temperature distribution for the case of the pump light distributed as a sine function.
Figure 9:
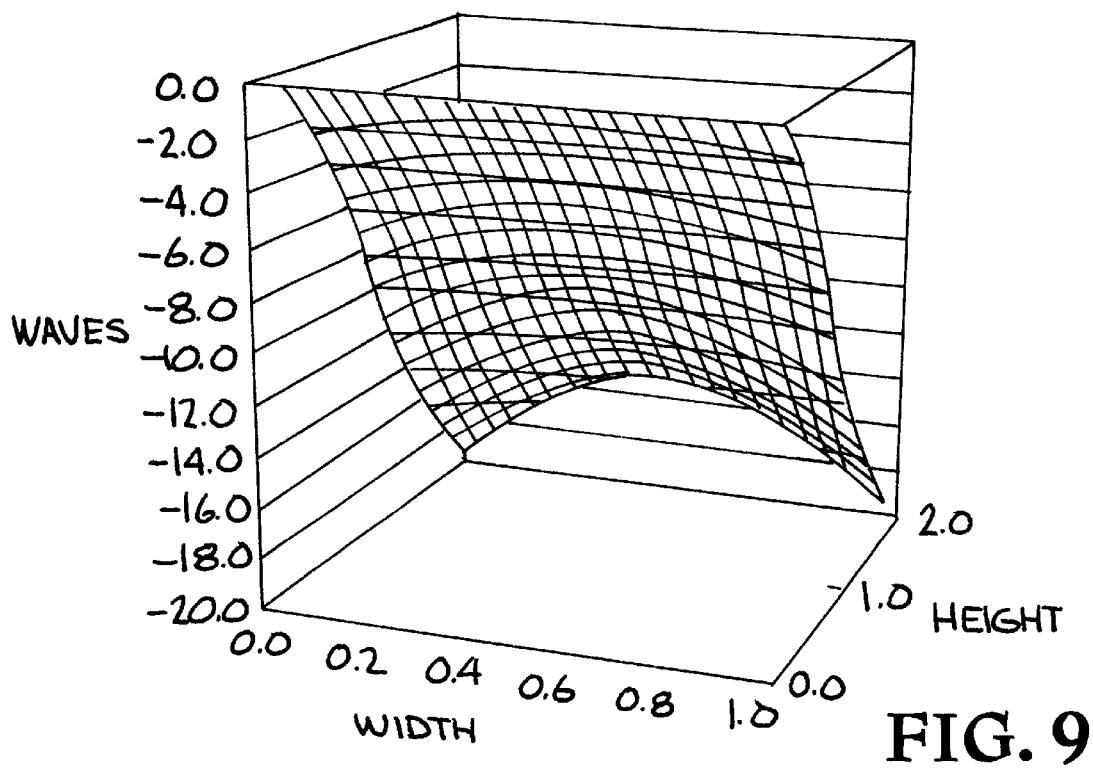
FIG. 9 shows half gain section OPD for sine distribution case.
Figure 10:
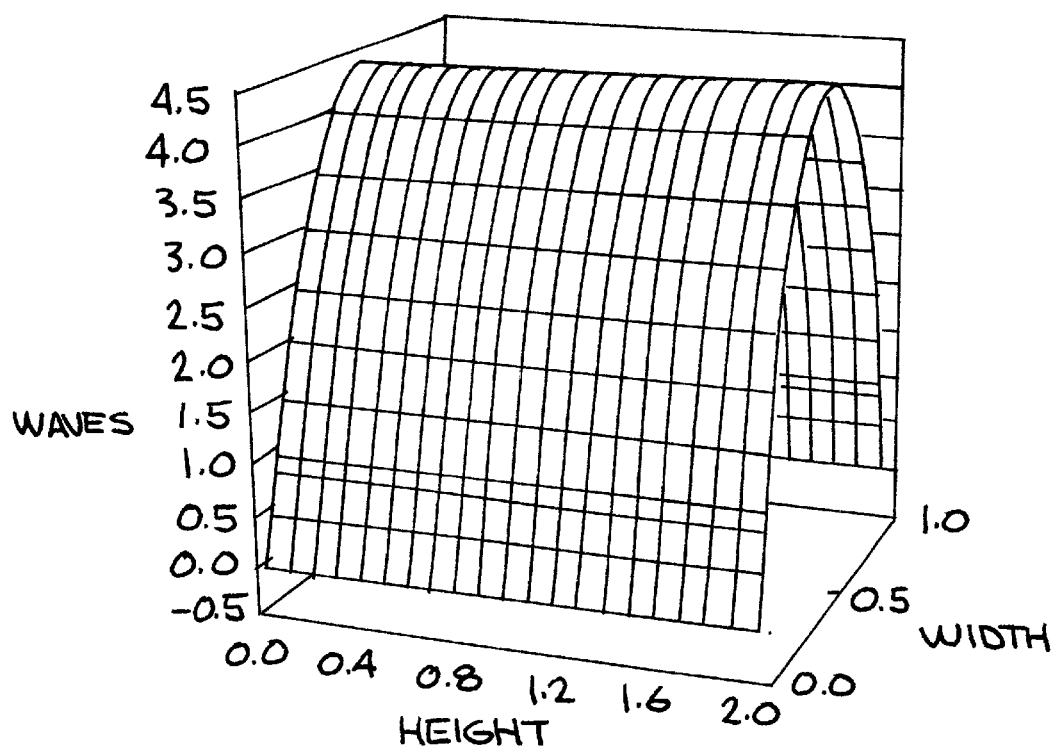
FIG. 10 shows OPD not canceled by reversed wedges. Sine distribution case.
Figure 11:
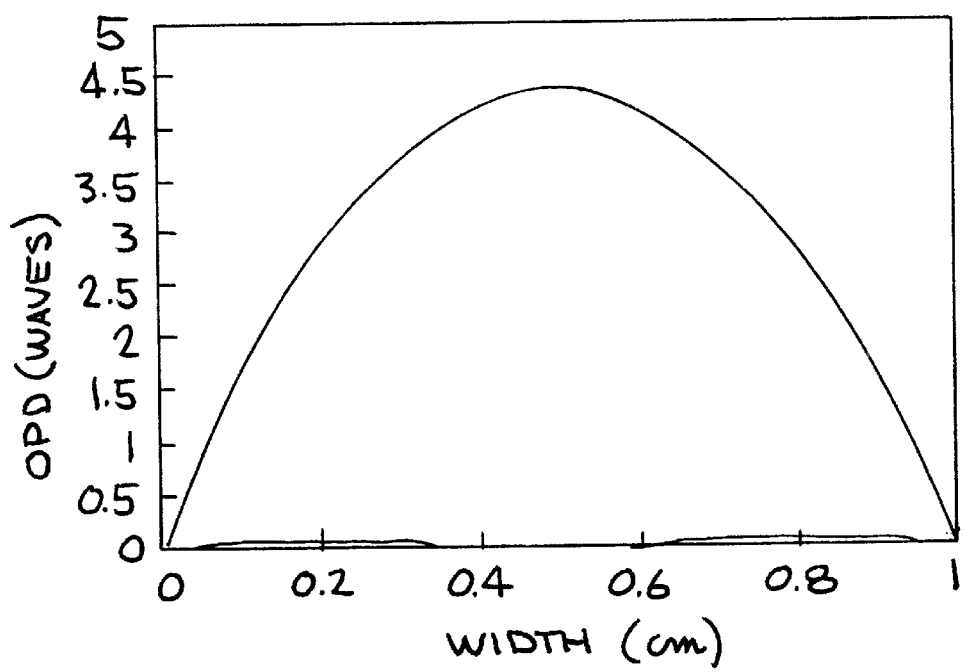
FIG. 11 shows residual phase error not corrected by a simple parabola. Sine case.

The following figures are analogous to the set for the uniform case. FIG. 8 shows temperature distribution for the case of the pump light distributed as a sine function. FIG. 9 shows half gain section OPD for sine distribution case. FIG. 10 shows OPD not canceled by reversed wedges. Sine distribution case. FIG. 11 shows residual phase error not corrected by a simple parabola. Sine case.

However, as we see below the wavefront correction remains excellent, better than 0.1 wave center to edge over the gain cross section. One can therefore conclude that even with a quite non-uniform pump distribution, the wavefront performance remains controllable with a simple E Mirror and wedge correction. Additional intercavity optics may be required, but compared to the case a birefringence and focus correction needed in solid state lasers at one tenth this operating power, the situation appears quite manageable.

Similar studies to power oscillators of 50 and 100 kW show similar performance. In these cases the uncorrectable residual remains less than 0.1 waves. A factor of two increase in flow volume and speed were used to reduce the temperature rise there by controlling the phase errors.

Figure 12:
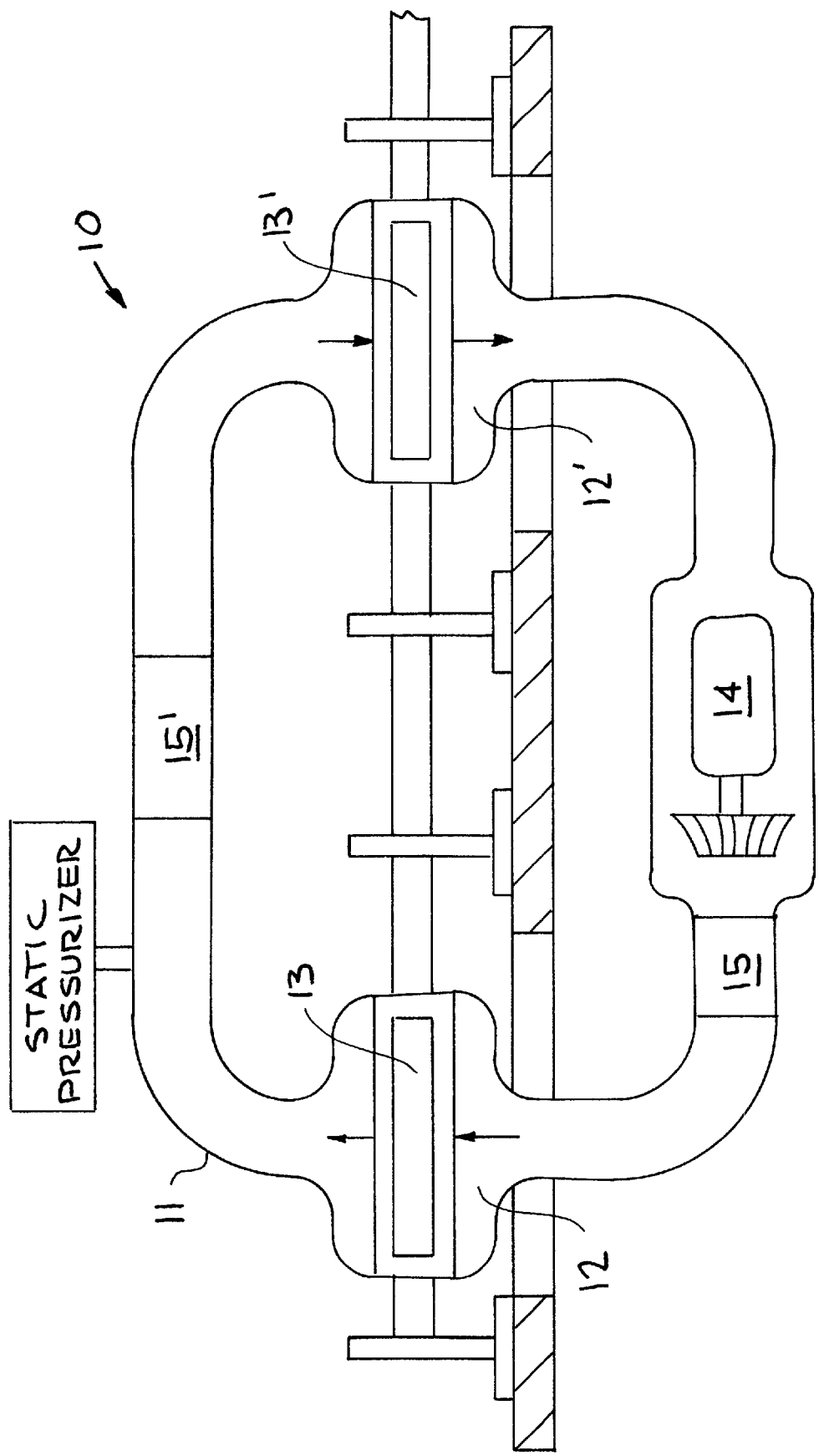
FIG. 12 illustrates an embodiment of a laser constructed in accordance with the present invention.

Referring now to FIG. 12, an embodiment of a laser constructed in accordance with the present invention is illustrated. The laser system is generally designated by the reference numeral 10. The laser system 10 utilizes a flowing lasing liquid that is optically excited to provide a powerful laser beam. A pair of lasing chambers 12 and 12' contain a pair of semiconductor pumping devices 13 and 13' respectively. The semiconductor pumping devices 13 and 13' are used to optically excite the liquid lasing medium within the optical cavities, lasing chambers 12 and 12'.

The semiconductor pumping devices 13 and 13' can be semiconductor diode lasers or light emitting diodes. A pump 14 circulates the lasing liquid through a pair of heat exchangers/flow conditioners 15 and 15', a static pressurizer 16, and the optical cavities 12 and 12'. The geometry within the lasing chambers 12 and 12' is a straight flow channel with diode light incident on the fluid flowing through the channel. The laser system 10 provides a high power laser device that uses rare earth salts dissolved into aprotic liquids optically excited by light emitting diodes or semiconductor diode lasers 13 and 13'.

The lasing liquid is composed of rare earths dissolved in aprotic solvents. When dissolved in a glass or crystal metal ions, especially rare earth ions, exhibit strong laser characteristics. When dissolved in water, or other hydrogen containing solvents, vibrational quenching severely reduces the upper excited state lifetime of these rare earth ions, making them unsuitable as a laser medium. This problem is solved by removing the hydrogen and using an aprotic solvent, for example selenium oxichloride. Work in this field has continued and focused on the oxichlorides of selenium and phosphorous as well the chlorides of tin, titanium, antimony, zinc, boron, and aluminum. A wide variety of rare earths dissolved in these aprotic solvents have been investigated. The best performance was seen for Neodymium. Inorganic liquid lasers based on Neodymium salts dissolved in aprotic acid solutions have been successfully demonstrated. Since the host is a liquid, it can be removed from the optical cavity when it becomes heated avoiding the inevitable optical distortion and birefringence common to glass and crystal hosts. The liquid lasing medium is circulated through a closed loop. The closed loop is generally designated by the reference numeral 11. The closed loop 11 circulates the lasing liquid into and out of the lasing chambers 12 and 12'.

Due to the large variation of the index or refraction of a liquid, significant wavefront distortion occurs as the lasing liquid is thermally loaded. Two systems are use to remedy the situation. In one system, the gain medium is' divided into two equal parts and placed in series within the optical cavities 12 and 12' respectively. The flow is in opposite directions through the optical cavities 12 and 12'. The resulting optical wedges are equal and opposite causing them to cancel to first order. The linear component, or optical wedge, that builds up in the liquid as it flows past the pump windows is predictable and steady. By arranging the two cells, optical cavities 12 and 12', in series and having opposite flow directions allows the wedge to be canceled. Because of the Beer's law (exponential) nature of the pump radiation absorption, there is a second order term that does not cancel. This distortion is smaller than the original wedge and is a simple parabola in the direction transverse to the flow.

The above description applies to cases where the optical wedge in each cell is equal and steady in time. To deal with the cases where this may not be true, another embodiment, as described by FIG. 13, makes use of dynamic control of the temperature rise in one of the cells to compensate for errors introduced by the other cell.

Figure 13:
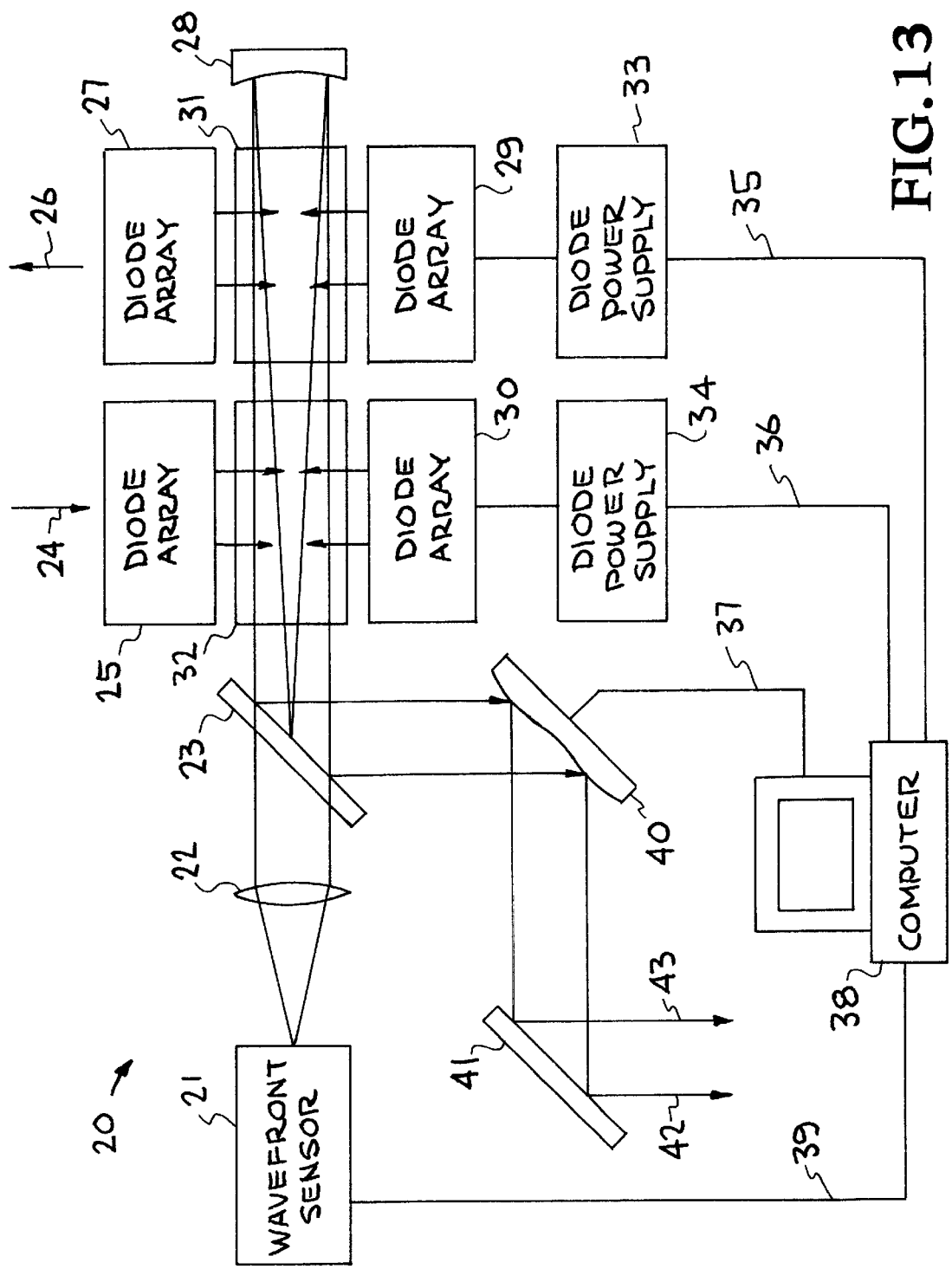
FIG. 13 illustrates a laser system of the present invention.

Referring now to FIG. 13, another embodiment of a laser constructed in accordance with the present invention is illustrated. Again, two cells with opposite liquid flows are used. An embodiment of the invention uses an error signal derived from wavefront errors to feed back to the power supplies driving the semiconductor diodes that excite the liquid laser medium (enclosed in two oppositely flowing fluid cells) introducing an electrically controllable wedge into the laser cavity. Nulling the wedge created by the thermal loading of the laser medium occurs in real time to affect a correction of the linear portion of the optical wedge.

Referring again to FIG. 13, fluid flowing in opposite directions, 26 and 24, in cells 31 and 32 is optically excited by light emitted from semiconductor diode arrays, 25,27, 29,30. When the heat loads are balanced, the optical wedge formed by the heated fluid ion cells 31 and 32 cancel and the optical resonator, comprising a total reflector 28, Scarper/Leaker mirror 23, sees no net optical wedge. Residual wavefront errors are sampled by the focusing lense, 22, and wavefront sensor, 21, analyzed by the computer, 38, and corrected by the deformable mirror, 40 based on commands 37 from the computer. Subsequent reflection off the fast steering mirror, 41, allows for fine correction of any remaining point errors, 39, that may be introduced by the optical train ahead of it.

When a wedge error is detected by the sensor 21, two options are available to the software program in the computer. First if the error is due to an imbalance in the response to the heat load in the fluid in either cell, the software is programmed to modulate, commands 35, the power supplied by 33 and 34 seeking an optimum solution. Variations up to 10% in heat load have been analyzed and found to be correctable with little residual error in the final laser beam. The second option is to move the fast steering mirror, 41, to correct for pointing errors in the beam 42 and 43. In either case complex nested control loops are needed. These are not beyond the state of the art as demonstrated in isotope separation and astronomical applications. The scheme described above also can be applied to the case of a laser power amplifier. In that case mirror 28 is removed to allow passage of the signal beam into the fluid cells, and mirror 23 is a simple flat mirror with a controlled amount of leakage to the wavefront detector.

What is claimed is:

1. A laser method comprising:
    providing a lasing liquid in an optical laser cavity,
    optically exciting said lasing liquid in said optical cavity to provide a laser beam resulting in thermally induced optical phase errors,
    circulating said lasing liquid into and out of said optical cavity, and
    correcting the thermally induced optical phase errors.

2. The laser method of claim 1 wherein said step of correcting the thermally induced optical phase errors includes dividing the lasing liquid into two equal lengths along the laser propagation direction and placing the two lengths in series in the optical laser cavity.

3. The laser method of claim 2 wherein the lasing liquid in the two lengths is arranged to flow in opposite directions into and out of said optical cavity.

4. The laser method of claim 1 wherein said step of correcting the thermally induced optical phase errors includes using a mirror to reduce wavefront distortion.

5. A lasing method comprising:
    providing a flowing lasing liquid in an optical laser cavity,
    optically exciting said flowing lasing liquid in said optical cavity to provide a laser beam, said flowing lasing liquid resulting in thermally induced optical phase errors,
    circulating said flowing lasing liquid into and out of said optical cavity, and
    correcting the thermally induced optical phase errors.

6. The lasing method of claim 5 wherein said step of correcting the thermally induced optical phase errors includes dividing the lasing liquid into two equal lengths along the laser propagation direction and placing the two lengths in series in the optical laser cavity.

7. The laser method of claim 6 wherein the lasing liquid in the two lengths is arranged to flow in opposite directions into and out of said optical cavity.

8. The laser method of claim 5 wherein said step of correcting the thermally induced optical phase errors includes using a mirror to reduce wavefront distortion.

9. A laser system, comprising:
an optical cavity,
a lasing liquid within said optical cavity,
a laser pumping device within said optical cavity that produces thermally induced optical phase errors,
a circulation system for circulating said lasing liquid into and out of said optical cavity, and
a system for correcting the thermally induced optical phase errors.

10. The laser system of claim 9 wherein said system for correcting the thermally induced optical phase errors includes a system for circulating said liquid lasing medium through a closed loop so that the flowing lasing liquid is divided into two equal lengths along the laser propagation direction and placed in series in the optical laser cavity with the fluid flows arranged in opposite directions.

11. The laser system of claim 9 wherein said system for correcting the thermally induced optical phase errors includes a system using a mirror to reduce wavefront distortion.

* * * * *